United States Patent
Harris

(10) Patent No.: US 9,014,971 B2
(45) Date of Patent: *Apr. 21, 2015

(54) GROUND LOCATION OF WORK TRUCK

(75) Inventor: Christopher Harris, Fishers, IN (US)

(73) Assignee: Systec Corporation, Indianapolis, IN (US)

( * ) Notice: Subject to any disclaimer, the term of this patent is extended or adjusted under 35 U.S.C. 154(b) by 88 days.

This patent is subject to a terminal disclaimer.

(21) Appl. No.: 13/544,173

(22) Filed: Jul. 9, 2012

(65) Prior Publication Data

US 2012/0273566 A1 Nov. 1, 2012

Related U.S. Application Data

(63) Continuation-in-part of application No. 13/231,793, filed on Sep. 13, 2011, now Pat. No. 8,831,878.

(60) Provisional application No. 61/382,174, filed on Sep. 13, 2010.

(51) Int. Cl.
 *G08B 21/00* (2006.01)
 *G01S 1/70* (2006.01)
 *G01C 21/20* (2006.01)

(52) U.S. Cl.
 CPC ............... *G01S 1/70* (2013.01); *G01C 21/206* (2013.01)

(58) Field of Classification Search
 USPC ........... 701/28, 408, 514, 519, 523; 700/258, 700/259, 254; 348/113, 116, 118, 119, 120, 348/164; 382/103, 104, 106, 153
 See application file for complete search history.

(56) References Cited

U.S. PATENT DOCUMENTS

| | | | | |
|---|---|---|---|---|
| 4,940,925 A * | 7/1990 | Wand et al. | .................. | 318/587 |
| 5,260,694 A * | 11/1993 | Remahl | ....................... | 340/674 |
| 7,151,979 B2 | 12/2006 | Andersen et al. | | |
| 7,394,380 B2 | 7/2008 | Ballin et al. | | |
| 7,613,617 B2 | 11/2009 | Williams et al. | | |
| 2002/0134835 A1* | 9/2002 | Kennedy | ....................... | 235/384 |
| 2004/0093100 A1* | 5/2004 | Gleis | ............................... | 700/95 |
| 2008/0193009 A1* | 8/2008 | Sonoura | ....................... | 382/153 |
| 2009/0021347 A1* | 1/2009 | Schneider et al. | ........... | 340/5.71 |
| 2009/0212929 A1* | 8/2009 | Drory et al. | ................ | 340/426.1 |

* cited by examiner

*Primary Examiner* — Khoi Tran
*Assistant Examiner* — Adam Mott
(74) *Attorney, Agent, or Firm* — Maginot, Moore & Beck, LLP

(57) ABSTRACT

A vehicle tracking system for tracking a position of at least one vehicle of a plurality of vehicles within a region, includes a plurality of identifiers, an imaging device, and a controller. At least one of the identifiers is provided on each of the vehicles. The imaging device is configured to generate image data including (i) region data representative of the region and (ii) identifier data representative of the identifiers located in the region. The controller is configured (i) to process the identifier data to generate position data representative of a position of each of the identifiers within the region, (ii) to process the identifier data to generate identification data that are unique to each identifier, and (iii) to output at least one of the image data, the position data, and the identification data to a monitor.

14 Claims, 6 Drawing Sheets

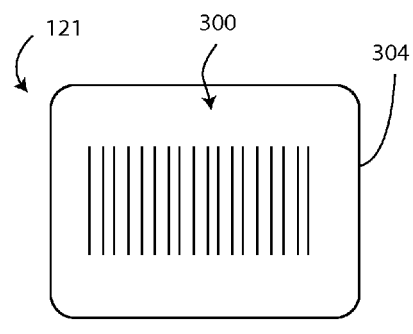
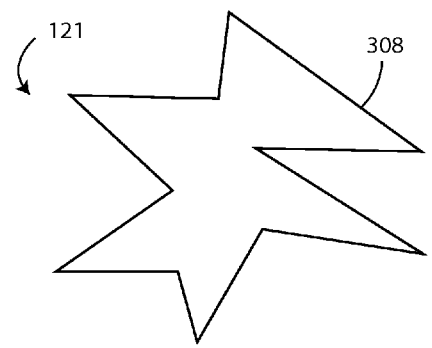
FIG. 6	FIG. 7
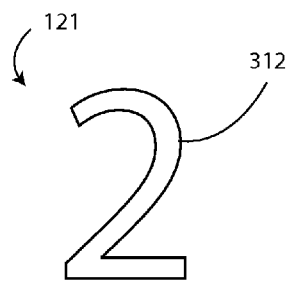
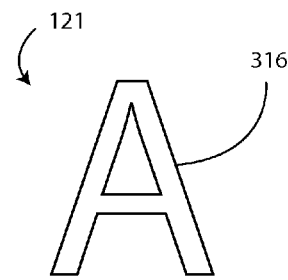
FIG. 8	FIG. 9

GROUND LOCATION OF WORK TRUCK

This application is a continuation-in-part of utility application Ser. No. 13/231,793, filed Sep. 13, 2011, which claims priority to provisional application Ser. No. 61/382,174, filed Sep. 13, 2010, the disclosures of which are incorporated by reference herein in their entirety.

BACKGROUND

The present disclosure relates to the field of electronic tracking and identification and especially to the tracking and identification of load moving devices, such as forklifts or other vehicles.

In an exemplary production facility, a conveyer system transports loads of product or other items, referred to simply as loads, to a receiving region. Equipment operators use forklifts, or other vehicles, to move each load from the receiving region to one or more loading docks of a distribution region of the production facility. A tractor-trailer or other load hauler is typically positioned at each loading dock to receive the loads from the forklifts.

The floor of a busy production facility typically becomes heavily trafficked with forklifts and equipment operators. Accordingly, one or more supervisors may be tasked with monitoring the production facility to ensure that the equipment operators move each load to the correct loading dock. If the production facility is sufficiently small, a single supervisor may track the forklifts and the loads from the floor of the production facility. A large production facility, however, may require multiple supervisors and/or assistants. Of course, the cost of additional personnel may be prohibitively expensive for some organizations.

To reduce the cost of tracking load moving devices within a production facility, one or more video cameras may be positioned in view of at least the receiving region and the distribution region of the production facility. The cameras are typically connected to one or more video screens, which may be monitored from a location remote from the floor of the production facility by a single person. The camera system generally increases the field of view over that of a person standing on the facility floor, in the nature of a typical surveillance camera.

The camera system, however, does not enable a viewer of the monitor(s) to easily identify a particular forklift being utilized by an equipment operator or a particular load being moved by a forklift. This is because, as viewed on the monitors, each forklift and each load appears virtually identical to each other forklift and load on the production floor. Accordingly, further developments in the field of electronic tracking and identification are desirable.

SUMMARY

According to one embodiment of the present disclosure, a vehicle tracking system for tracking a position of at least one vehicle of a plurality of vehicles within a region, includes a plurality of identifiers, an imaging device, and a controller. At least one of the identifiers is provided on each of the vehicles. The imaging device is configured to generate image data including (i) region data representative of the region and (ii) identifier data representative of the identifiers located in the region. The controller is configured (i) to process the identifier data to generate position data representative of a position of each of the identifiers within the region, (ii) to process the identifier data to generate identification data that are unique to each identifier, and (iii) to output at least one of the image data, the position data, and the identification data to a monitor.

According to another embodiment of the present disclosure a vehicle tracking system is provided for tracking a plurality of vehicles within a region. Each of the vehicles is associated with a corresponding load. The vehicle tracking system includes a plurality of identifiers, a plurality of detectors, an imaging device, and a controller. At least one of the identifiers is provided on each of the vehicles. At least one of the detectors is provided on each of the vehicles. Each of the detectors is configured to detect the load associated with the vehicle and to emit a corresponding load identifying signal. The imaging device is configured to generate image data including (i) region data representative of the region and (ii) and identifier data representative of the identifiers located in the region. The controller is configured (i) to process the load identifying signals and the identifier data to generate load position data representative of a corresponding position of each of the loads within the region and (ii) to output the load position data to a monitor.

BRIEF DESCRIPTION OF THE FIGURES

FIG. 6 is a plan view of the identifier of the system of FIG. 1 provided as an optical code.

FIG. 7 is a plan view of the identifier of the system of FIG. 1 provided as a shape member.

FIG. 8 is a plan view of the identifier of the system of FIG. 1 provided as a character.

FIG. 9 is a plan view of the identifier of the system of FIG. 1 provided as a different character.

DETAILED DESCRIPTION

Figure 1:
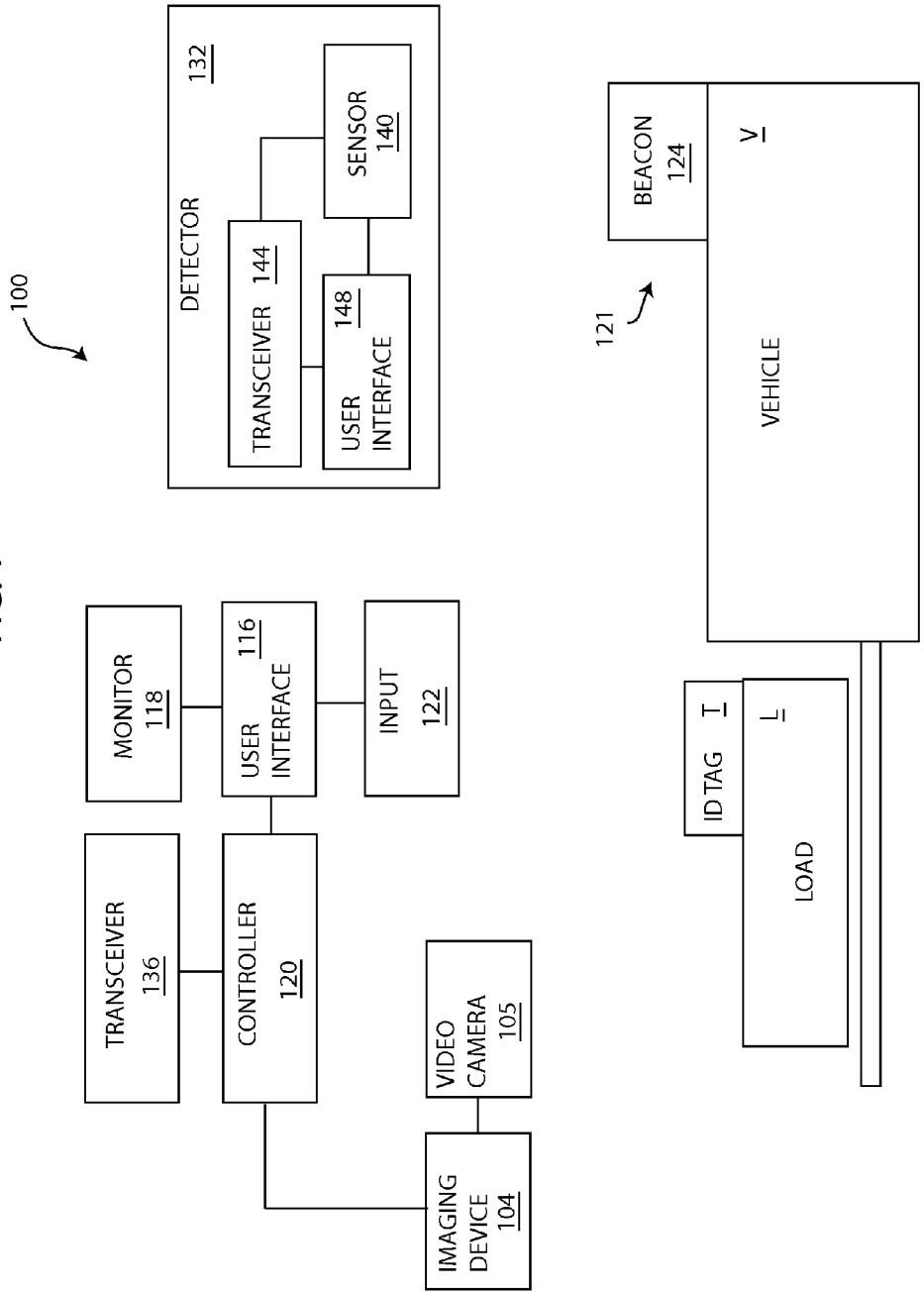
FIG. 1 depicts a block diagram of a system configured to determine the position of a vehicle that includes an identifier, and to identify a load being carried by the vehicle.

For the purposes of promoting an understanding of the principles of the system described herein, reference is made to the embodiments illustrated in the drawings and described in the following written specification. It is understood that no limitation to the scope of the system is thereby intended. It is further understood that the system described herein includes any alterations and modifications to the illustrated embodiments and includes further applications of the principles of the system as would normally occur to one skilled in the art to which this system pertains.

As shown in FIGS. 1-4, a vehicle tracking system 100 tracks the position of at least one vehicle V within a region R (FIG. 2) and identifies the load(s) L being transported by the vehicle V. As used in this document, the term "vehicle," refers to any apparatus or mobile device that moves a load L or assists in moving a load including, but not limited to, a forklift, a hand truck, an automated mover, and the like.

With reference to FIG. 1, the portion of the system 100 configured to track the position of the vehicle V includes an imaging device 104, a user interface 116, a controller 120, and an identifier 121 connected to the vehicle (among other components, described herein). At least one identifier 121 is provided on the vehicle V. As used herein, the identifier 121 is any device, apparatus, member, or system that is identifiable by the imaging device 104. In the embodiment of FIG. 1, the identifier 121 is provided as a beacon 124. The beacon 124 emits an identifying signal that is unique or has unique characteristics as compared to the other elements of the system 100. In one embodiment described herein, the beacon 124 emits light having a particular wavelength or emits light within a particular wavelength band that is detectable by the imaging device 104. For simplicity, the beacon 124 is described herein as emitting a particular "color" of light. In one embodiment, the beacon 124 includes an incandescent light bulb and a light filter, which only transmits light of the desired color.

Each beacon 124 is configured to emit light of a different color, with each color being distinguishable by the imaging device 104. For example, a system 100 configured to track the position of three vehicles V may include a beacon 124 configured to emit blue light connected to the first vehicle, a beacon configured to emit red light connected to the second vehicle, and a beacon configured to emit green light connected to the third vehicle. It is generally desirable for the beacons 124 to emit light in a color that is generally not emitted or reflected by other objects within the region R. It is contemplated that groups of vehicles V may have the same color of beacon 124 to enable the system 100 to track the groups. It is further contemplated that the beacon 124 may be modified to emit any type of unique identifying signal that is distinguishable by the imaging device 104. In one particular embodiment, the beacon 124 emits light having a wavelength that is invisible to the human eye, but that is visible to the imaging device 104. The beacon 124 may have a self-contained power supply, such as a battery, or the beacon may receive electrical power from the vehicle V.

With continued reference to FIG. 1, the imaging device 104 includes at least one video camera 105 that generates image data. The video camera 105 is fixedly mounted in a position elevated above a floor of a facility, such that the video camera has a fixed field of view of the region R in which the vehicles V may be located. That is, the camera 105 does not pan, tilt, or zoom. In one particular embodiment, the camera 105 is an Internet Protocol imaging device that is configured to transmit data to the controller 120 via an Ethernet connection. Exemplary imaging devices of this type are presently manufactured by Axis® Communications; however, any other similar camera may be used.

The video camera 105 is a full-color video camera that is capable of detecting the identifiers 121. In the embodiment of FIGS. 1-4, the video camera 105 detects the wavelength(s) of light emitted each of the beacons 124. The digital image data generated by the video camera 105 is transferred to the controller 120.

The image data generated by the video camera 105 includes region data and identifier data. The region data is representative of the region R in the field of the view of the camera 105 and includes data related to the objects and structures positioned therein. Portions of the region data may be static, such as the position of a distribution bay 212 (FIG. 2), whereas other portions of the region data may be dynamic, such as the current position of a vehicle V.

The identifier data is based on the identifiers 121 located in the region R. In particular, the identifier data is digital data that represents the position of each of the identifiers 121 within the region. In the embodiment of FIGS. 1-4, the identifier data is representative of the light that emitted by the beacons 124. In other embodiments, the identifier data may be representative of light that is reflected by the identifier 121. Still in other embodiments, the identifier data may be representative of any other means of detecting the identifier 121.

To facilitate "viewing" of the identifiers 121 by the video camera 105, each beacon 124 is positioned atop a rod (not shown) connected to the vehicle V to position the beacon above any object that may obstruct the view of the camera 105. Therefore, the beacons 124 are connected to the vehicles V in a manner that enables the video camera 105 to have an unobstructed line of sight to each of the beacons within the region R. Typically, other types of identifiers 121 are also mounted or positioned in location that enables the video camera 105 to have an unobstructed line of sight to each of the identifiers within the region R.

Referring to FIG. 1, the user interface 116 includes a monitor 118 and an input device 122. In general, the monitor 118 may be one or more televisions and/or computer monitors. The input device 122 may be a keypad, keyboard, or any other such device, which may be used to input data to the controller 120. For example, the input device 122 may enable a user of the system 100 to identity which of the vehicles V and loads L within the field of view of the video camera 105 the system 100 should track and/or identify.

The controller 120 is an electronic data processing device, which is configured to execute a software routine for processing data and generating an output suitable for display on the monitor 118. The controller 120 may be implemented with one or more general or specialized programmable processors that execute programmed instructions. The instructions and data required to perform the programmed functions may be stored in an electronic memory associated with the processors. The components of the controller 120 may be provided on a printed circuit card or provided as a circuit in an application specific integrated circuit ("ASIC"). Each of the circuits may be implemented with a separate processor or multiple circuits may be implemented on the same processor. Alternatively, the circuits may be implemented with discrete components or circuits provided in very large scale integration ("VLSI") circuits. Also, the circuits may be implemented with a combination of processors, ASICs, discrete components, or VLSI circuits. In one particular embodiment, the controller 120 is a personal computer.

As shown in FIG. 1 and as briefly described above, the system 100 detects the presence of a load L being transported by a vehicle V within the region R. The system 100 detects the presence of a load L with the detector 132, which sends a load identifying signal to a transceiver 136 connected to the controller 120. The term "load," as used in this document, refers to any device, element, structure, or combination thereof that is to be moved by a vehicle V. Each load L includes one or more machine readable identification tags T, which identify the load and its desired destination within the region R. Exemplary tags T include but are not limited to radio frequency identification tags ("RFID") and image identifiers such as one dimensional bar codes, two dimensional bar codes, quick response codes ("QR codes"), and the like.

The detector 132 includes a sensor 140 and a user interface 148 connected to another transceiver 144. In one embodiment, the detector 132 is a handheld unit that is positioned near a tag T by an operator of the vehicle V to manually scan the tag. In another embodiment, the detector is associated with the vehicle V and automatically scans the tag T of the load L being moved by the vehicle (see FIG. 5).

The sensor 140 is an RFID sensor configured to detect RFID tags T and/or an optical sensor configured to optically scan image identifiers. The sensor 140 detects the tag T when the tag is positioned near the sensor (or vice versa), and generates load identifying data in response to detecting the tag T. The load identifying data includes data related to the load L including the desired destination within the region R and a load identification, which may be used by the controller 120 to access additional load information from a load information database. Upon scanning the tag T, the detector 132 sends data to the controller 120, which associates the load L with the vehicle V that is configured to move it.

The transceiver 144 of the detector 132 wirelessly transmits and receives data from the transceiver 136 wired to the controller 120. The transceivers 136, 144 may use any of the wireless data transmission protocols known to those of ordinary skill in the art. The transceiver 144 sends a load identifying signal, which includes the load identifying data (among other data), to the transceiver 136, which transmits the load identifying signal and data to the controller 120.

The user interface 148 of the detector 132 is a data display unit (not shown) and may include a data input unit (not shown). The data display unit is configured to display data received by the transceiver 144, the load identifying data, and other data in a user-readable format. In one particular embodiment, the user interface 148 is a liquid crystal display unit. The data input unit of the user interface 148 may be a keypad, keyboard, or any other data input device that may allow the operator to manually enter load data.

Figure 2:
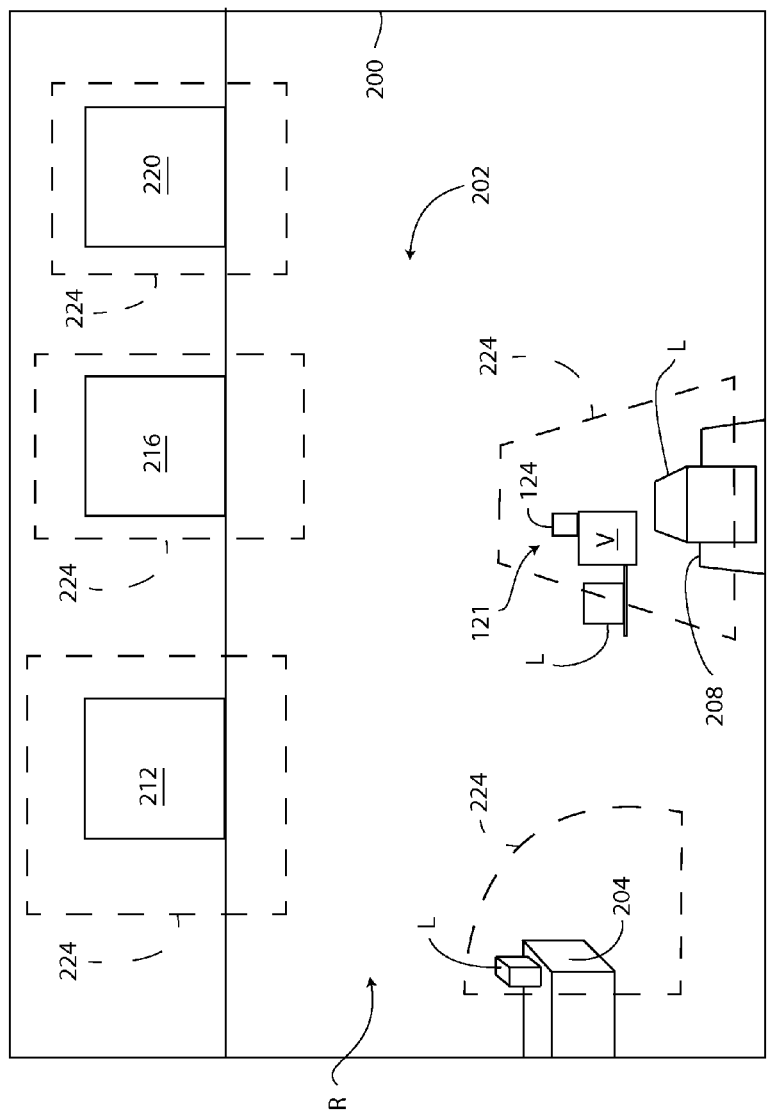
FIG. 2 illustrates a screenshot generated by the system of FIG. 1, the screenshot shows a perspective view of a portion of a production facility, five virtual zones are overlaid upon the screenshot.

As shown in FIG. 2, operation of the system 100 is described with reference to a screenshot 200 of a region R, which represents a portion of an exemplary production facility 202. As shown in the screenshot 200, loads L enter the production facility 202 at the receiving areas 204, 208. An equipment operator (not shown) uses the vehicle V to move the loads L to the distribution bays 212, 216, 220. One or more of the video cameras 105 of the imaging device 104 are positioned to monitor each receiving area 204, 208 and distribution bay 212, 216, 220.

The screenshot 200 represents a visual depiction of the image data generated by one of the video cameras 105 of the imaging device 104 (as well as other data) as may be seen on the monitor 118 by a user of the system 100. The controller 120 processes the image data and other data to generate numerous screenshots per second so that a "real-time" view of the production facility 202 is achieved.

The system 100 overlays one or more virtual zones 224 onto the screenshot 200. The input device 122 of the user interface 116 enables a user to adjust the size, shape, and position of the virtual zones 224, which may have any closed shape. After the virtual zones 224 are adjusted, zone data is sent to the controller 120, which represents the identifying characteristics of each virtual zone within the region R. As shown in FIG. 2, the virtual zones 224 are positioned to encompass the receiving areas 204, 208 and the distribution bays 212, 216, 220. The virtual zones 224 are visible on the monitor 118, but are not visible upon the floor of the production facility 202.

The controller 120 implements a software routine, which enables the system 100 to detect the position of each identifier 121 within the region R (i.e. within the screenshot 200). To this end, the controller 120 may utilize open source computer vision software such as the Aforge.Net software suite developed by Andrew Kirillov and licensed under the GNU Lesser General Public License including the Aforge.Net programs referred to as AForge RGB Filter and AForge Blob.

To detect the position of the vehicle V and its associated load L, the system 100 processes the image data generated by the imaging device 104 to at least partially isolate the identifier data from the region data. In particular, the controller 120 processes the image data with AForge RGB Filter or another similar image-processing program. The controller 120 processes the image data in search of the data set associated with the identifier 121. In the embodiment of FIGS. 1-4, the controller 120 processes the image data in search of the data that represents the color or wavelength of light emitted by each of the beacons 124, which the user desires to track. For example, the beacon 124 in FIG. 2 emits red light, thus the controller 120 processes the screenshot 200 to eliminate the image data that does not correspond to red light. The portion of the image data that the controller 120 determines is related to the beacon 124 is isolated in a data set referred to as the isolated identifier data.

Figure 3:
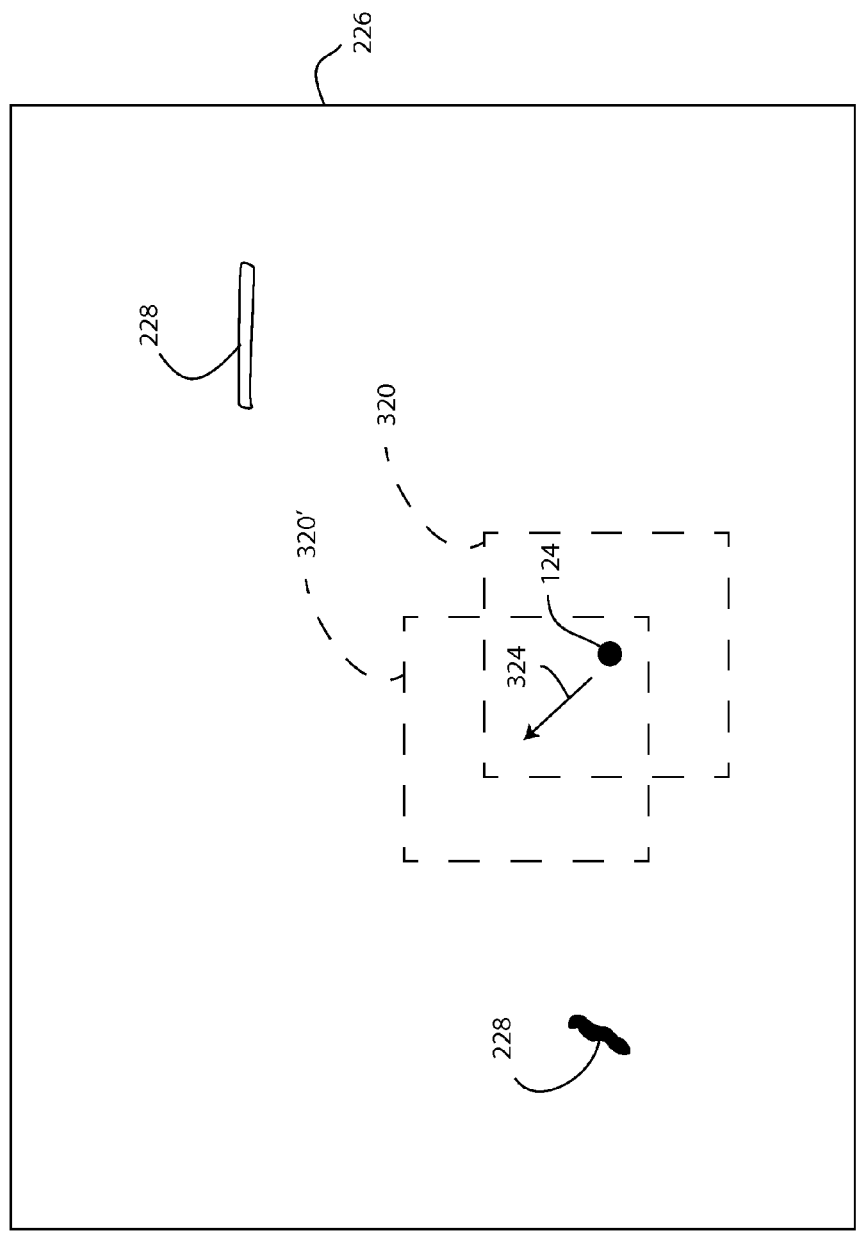
FIG. 3 illustrates a controller processed view of the screenshot of FIG. 2.

The controller 120 repeats this process to generate isolated identifier data, as shown graphically in FIG. 3, for each beacon 124 within the screenshot. The modified screenshot 226 includes the isolated identifier data for a beacon 124 emitting red light and data corresponding to artifacts 228. The artifacts 228 represent image data that is not associated with the beacon 124, but that are associated with objects in the production facility 202 that emit or reflect light in the same color as the beacon. The user interface 116 generally does not display the modified screenshot 226; instead, the screenshot 226 is representative of the processing steps performed by the controller 120.

Next, the controller 120 processes the isolated identifier data with AForge Blob or another similar image-processing program. The AForge Blob program searches the isolated identifier data in search of portions of data, which correspond to an identifier 121. As shown in FIG. 3, the beacon 124 corresponds to generally circular region of data, whereas the artifacts 228 encompass a larger area and have an elongated shape. The AForge Blob program searches the isolated identifier data, discriminates against the data corresponding to the artifacts, and retains the data corresponding to the beacons 124. Any element of the production facility 202 that regularly produces an artifact having a similar profile as one of the identifiers 121 should be eliminated to avoid generating false positive beacon identifications. Additionally or alternatively, the AForge Blob program may be configured such that the program ignores the image data associated with area(s) of the production facility 202 that regularly produce artifacts.

Next, the controller 120 processes the isolated identifier data to generate position data, which represents the position of each identifier 121 in the region R. The position data includes a coordinate position of each identifier 121. Generally, a horizontal coordinate and a vertical coordinate are used to identify the position of each identifier 121; however, the controller 120 may utilize other coordinate systems.

Thereafter, the controller 120 processes the isolated identifier data to generate identification data, which represents the particular identifier 121 that has been detected. Specifically, in the embodiment of FIGS. 1-4, the controller 120 processes the isolated identifier data to determine which "colors" of beacons 124 are present in the data. The identification data is generally a single variable of data for each detected beacon 124; however, other data systems may be utilized.

If the controller 120 has received one or more load identifying signals, the controller generates load position data by associating each load L with the position of a corresponding identifier 121. As described above, upon scanning a load L with the detector 132, the load is associated with a particular one of the vehicles V. Using the identification data and the position data, the controller 120 associates each load L with a corresponding identifier 121 position. Thus, by determining the position of the identifiers 121, the system 100 has determined the position of each detected load L being carried by a vehicle V within the region R.

Next, the controller 120 processes the position data and the zone data to generate active zone data, which includes data related to each zone in which an identifier 121 is positioned. Each zone of the zone data encompasses an area of positions of the region R. The controller 120 compares the position of each identifier 121 to the positions encompassed by the zones. If the position data indicates that a identifier 121 is positioned within a zone, the controller 120 flags the zone as an "active" zone and updates the active zone data to include the active zone. This process is repeated for the position of each identifier 121.

Figure 4:
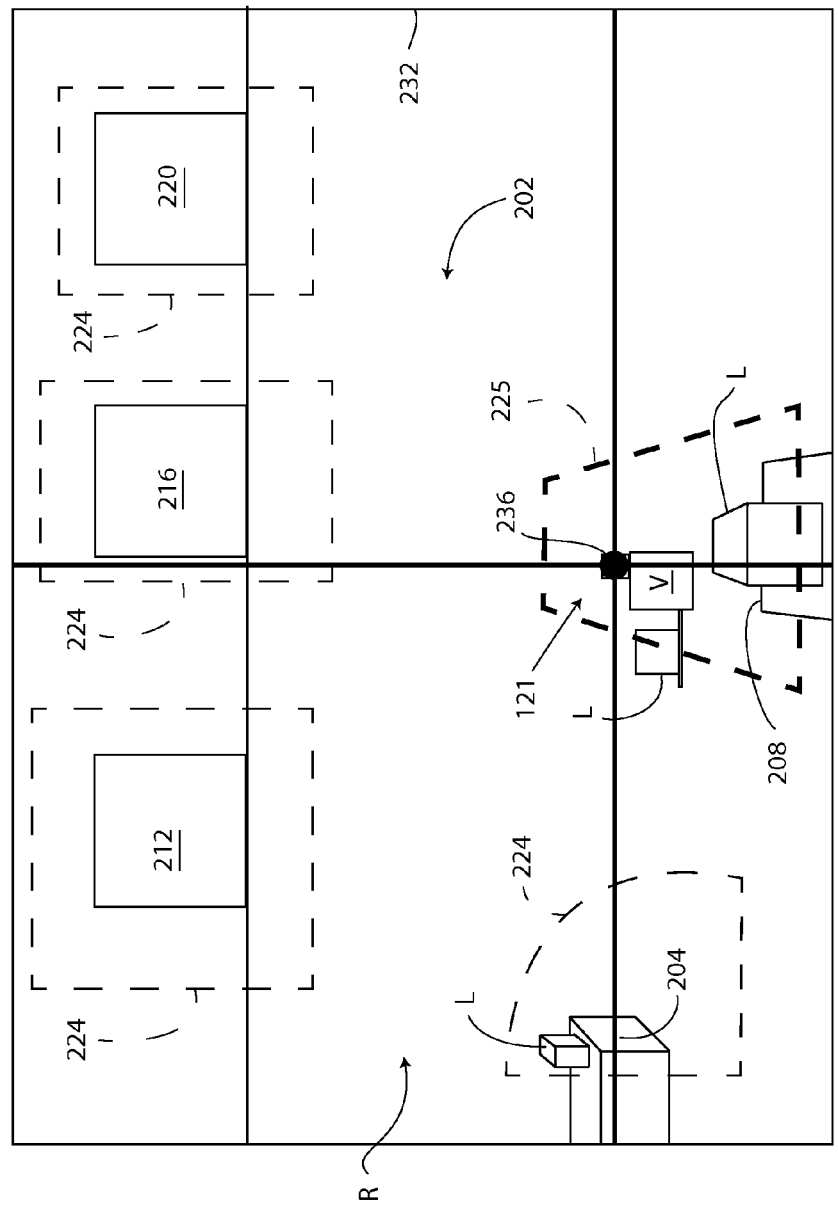
FIG. 4 illustrates the screenshot of FIG. 2, having been modified to emphasize the detected position of the identifier.

Next, as shown in the screenshot 232 of FIG. 4, the controller 120 outputs the image data, the position data, the identification data, the zone data, and the active zone data to the monitor 118. The image data appears on the monitor 118 as a video of the region R. The position data is shown on the monitor 118 by a position marker 236, which is positioned over the detected identifier 121. The position data may also be shown by a vertical marker 238 and a horizontal marker 240 which extend through the position marker 236. The identification data may be shown by the color of the position marker and the markers 238, 240, if present. For example, if the identifier 121 is a beacon 124 that emits red light, the position marker and the markers 238, 240 may have a red color on the monitor.

The zone data appears on the monitor 110 as an outlined portion of the region R as shown by the inactive zones 224 and the active zone 225. The outlined portion of the active zone 225 has different appearance than the inactive zones 224 to highlight to a viewer that an identifier 121 is present in the zone 225. In particular, the outlined portion of the zone 225 may be more brightly illuminated and/or illuminated in the color of the light radiated by the beacon 124 positioned therein.

The controller 120 periodically updates the user interface 116 to show the real time position of each identifier 121 positioned within the field of view of the camera 105. Accordingly, the controller 120 may track and store in an electronic memory the position of one of the identifiers 121 from one screenshot to the next to enable the controller to calculate a vector 324 (FIG. 3) representing a heading having a direction and a speed of movement of the vehicle V. The vector 324 enables the controller 120 to project the path to be taken by the vehicle V and to alert a viewer of the user interface 116 if the projected path is undesirable.

The system 100 also operates to determine if the equipment operator of the vehicle V has moved the load L to a desired destination, such as one of the distribution bay 212, 216, 220. As described above, the load L may have assigned to it a particular destination within the region R, such as to one of the distribution bays 212, 216, 220. This assigned distribution bay may be included in the load data received by the controller 120. The controller 120 associates the desired distribution bay with a desired virtual zone 224, 225 using a look-up table or any other method of association. Alternatively, the controller 120 is supplied with data indicative of the desired virtual zone 224, 225 of each load L. As shown in FIG. 4, each of the distribution bays has a virtual zone 224, 225 positioned around it.

Thereafter, the controller 120 continues to process the image data to determine if any of the loads L are positioned in their desired zone or in another one of the undesired zones. The controller 120 generates matching virtual zone data when a load L is positioned in its desired zone. The controller 120 outputs the matching virtual zone data to the monitor 118, where it appears different than the other zones, which do not contain a load in its desired zone. Additionally, before a load L reaches its desired zone, the controller 120 may cause the monitor 118 to identify the desired distribution bay. For example, the controller 120 may determine that the load L being carried by the vehicle of FIG. 4 should be moved to distribution bay 212. If the equipment operator moves the vehicle V to the distribution bay 212 such that the beacon 124 enters the virtual zone 224 associated with the bay 212, then the controller 120 determines that the load was moved to the correct bay. If, however, the equipment operator moves the load L (and the vehicle V) to any other distribution bay 216, 220 or does not move the load to the distribution bay 212 within a predetermined time period, then the controller 120 may alert the viewer of the user interface 116. The controller 120 may produce a visible indicator on the monitor 118 or emit a sound when the load L is moved to a location other than the desired location.

Figure 5:
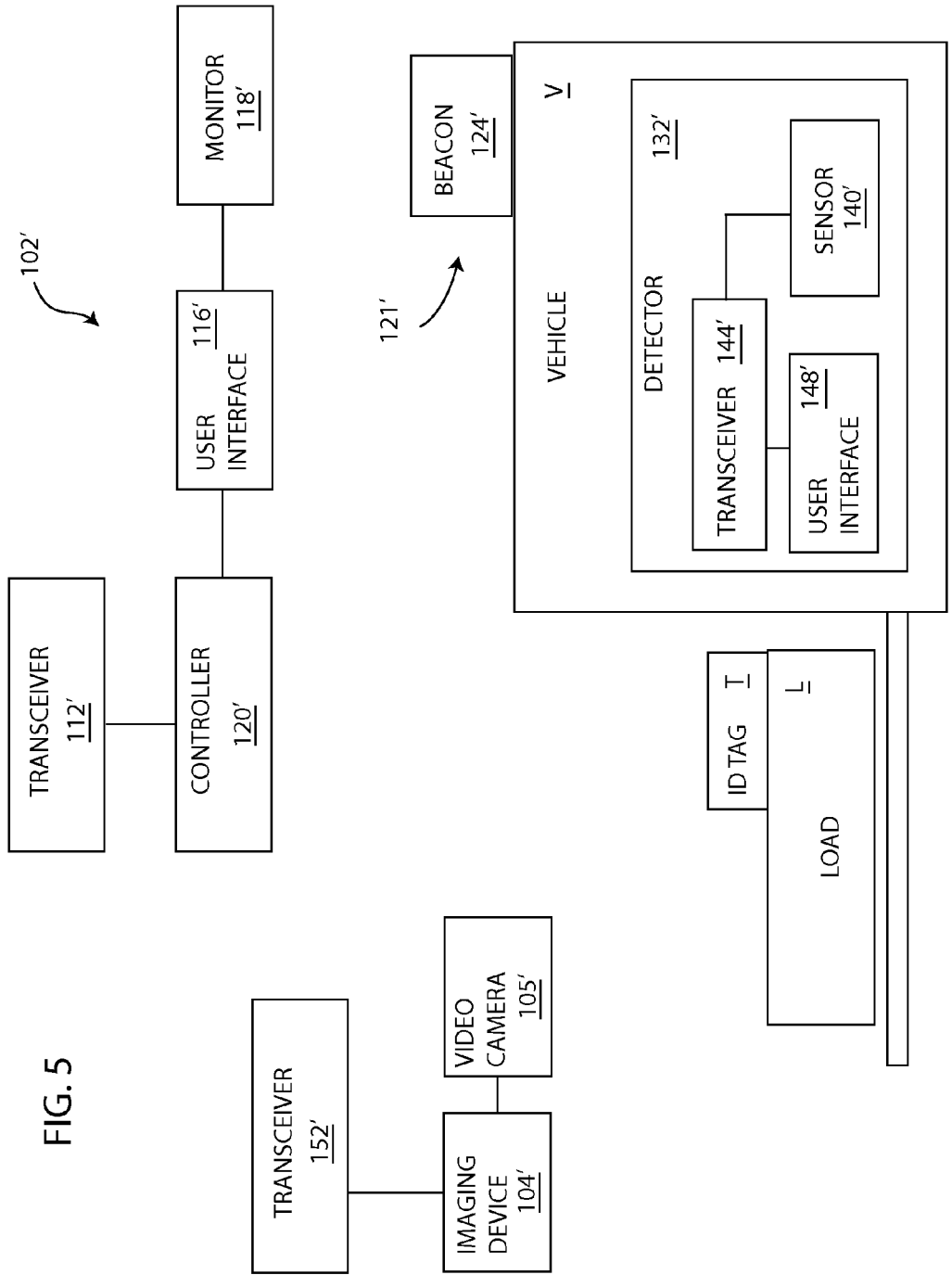
FIG. 5 depicts a block diagram of an alternative embodiment of a system configured to determine the position of a vehicle and to identify a load being carried by the vehicle.

FIG. 5 depicts another embodiment of a system 102' configured to track the position of a vehicle V and to identify a load L being transported by the vehicle. The system 102' works identically to the system 100 of FIG. 1, except for the following differences. The imaging device 104' includes a video camera 105' and a transceiver 152', which enables the imaging device 104' to transmit the image data wirelessly to the transceiver 112'. Thus, the imaging device 104' may simplify the installation of the system 102' by eliminating the wired Ethernet connection between the imaging device 104 and the controller 120 of the system 100 of FIG. 1. Additionally, the imaging device 104' may be configured to pan, tilt, and/or zoom. Accordingly, the system 102' may highlight the position of a detected vehicle V without displaying one or more zones 224, 225 which would become misaligned due to the movement of the camera. Another difference is that the detector 132' is not a portable handheld unit. Instead, the detector 132' is connected to the vehicle V and is positioned to detect the tag T on the load L when the vehicle V becomes associated with the load, thereby eliminating the need for the equipment operator to manually scan the tag T.

In another embodiment of the system 100 having an identifier 121 provided as a beacon 124, instead of continuously emitting light, the beacon intermittently emits light in any identifying sequence of light flashes that is identifiable by the controller 120. In this regard, each beacon 124 may be programmed to emit a different identifying sequence of light flashes that represents one or more characters (numbers, letters, and/or symbols) in Morse code. For example, a first beacon 124 may be energized and de-energized in a pattern representing the letter "A" in Morse code (". —") and a second beacon may be energized and de-energized in a pattern representing the letter "B" in Morse code ("— . . . "). The beacon 124 emits the identifying sequence of light flashes within a predetermined time period. The predetermined time period is approximately three to five seconds.

Alternatively, instead of Morse code, the identifying sequence of light flashes emitted by the beacon 124 is a particular frequency of light flashes. For example, a first beacon 124 emits a flash of light once every second (1 Hz) whereas another beacon emits a flash of light twice every second (2 Hz). The controller 120 identifies each beacon 124 by comparing the frequency of the light flashes with entries in a database of light flash frequencies corresponding to the vehicles V.

In each embodiment, the identifying sequence of light flashes does not exceed the sampling rate of the image device 104 and the video camera 105. Also, in each embodiment in which an identifying sequence of light flashes is emitted by the beacon 124, each beacon may emit the same wavelength of light since the controller 120 distinguishes among the various beacons by identifying the sequence of light flashes and not the wavelength(s) of light emitted by the beacons.

When the controller 120 receives the image data that includes data representing the identifying sequence of light flashes, the controller 120 isolates the identifier data from the region data using the AForge RGB Filter or another similar image-processing program, as described above. Next, the controller 120 determines which vehicle(s) V is associated with the identifier data. To do this, the controller 120 processes the identifier data using the AForge Blob program (or another image-processing program) to remove artifact data and to isolate the identifier data corresponding to the beacon(s). The controller 120 processes data corresponding to at least the number of screenshots collected during the predetermined time period to ensure that the entire identifying sequence of light pulses is analyzed. After processing the screenshots, the controller 120 matches the detected identifying sequence of light flashes to known sequences of light flashes that correspond to a vehicle. The known sequences of light flashes are stored in a database associated with the controller 120.

As shown in FIGS. 6-9, in yet another embodiment of the system 100 the identifier 121 is a passive member that is identifiable by the image device 104 and video camera 105. The passive type of identifier 121 does not "emit" a signal; instead, the passive type of identifiers reflects light, but does not include a light source. Various exemplary passive types of identifiers 121 are described below.

As shown in FIG. 6, in one embodiment, the identifier 121 is provided as an optical code 300 such as a linear barcode or a two dimensional bar code, including quick response codes (QR codes) and the like. The optical code 300 may be printed on an identifier sheet member 304 that is attachable to the vehicle V. The identifier sheet member 304 may be formed from a flexible material that is magnetically connected to the vehicle V or that is connected to the vehicle with an adhesive. Alternatively, the optical code 300 may be formed directly on the vehicle V, such as by painting the optical code onto the roof or another portion of the vehicle that has a direct line of sight to the video camera 105.

The controller 120 isolates the image data representing the optical code 300 from the region data and the artifact data, using an open source image processing program that detects optical codes. Then the data that the optical code 300 represents (typically a string of characters) is compared to a database to determine which vehicle V is associated with the detected optical code.

As shown in FIG. 7, in another embodiment the identifier 121 is provided as a shape member 308 that is attached to the vehicle V. The shape member 308 defines a shape that is unique to the region R. In particular, the shape of the shape member 308 is selected to be different from each other element within the region, to assist the controller 120 identifying the image data associated with the shape member.

The shape member 308 may be laser cut, or otherwise formed, from metal, plastic, paper or any other material. Alternatively the shape member 308 may be formed directly on the vehicle V, such as by painting the shape member onto the roof or another portion of the vehicle that has a direct line of sight to the video camera 105. In at least one embodiment, the shape member 308 is positioned such that the perimeter of the shape member contrasts with the surrounding area of vehicle to assist the controller 120 in identifying the shape member.

The controller 120 isolates the image data representing the shape member 308 from the region data and the artifact data (if any), through a process similar to the way in which the controller isolates the data associated with the beacons 124. Then the data associated with the shape member 308 is compared to shape member data stored in a database to determine which vehicle V is associated with the detected shape member.

With reference to FIGS. 8 and 9, the identifier 121 may further be provided as a character 312, 316 that is attached to the vehicle V. The character 312, 316 may be one or more letters, numbers, and/or symbols. The character 312, 316 may be laser cut, or otherwise formed, from metal, plastic, paper, vinyl, or any other material. Alternatively the character 312, 316 may be formed directly on the vehicle V, such as by painting the character onto the roof or another portion of the vehicle that has a direct line of sight to the video camera 105. In at least one embodiment, the character 312, 316 is positioned such that the perimeter of the character contrasts with the surrounding area of vehicle to assist the controller 120 in identifying the character.

The controller 120 isolates the image data representing the character 312, 316 from the region data and the artifact data (if any), using an open source optical character recognition program. Then the detected character 312, 316 is compared to characters stored in a database of characters to determine which vehicle V is associated with the detected character.

In at least some embodiments the controller 120 implements a software routine that frees up processing power of the controller and increases the accuracy of the detected heading of a vehicle V. As shown in FIG. 3, the portion of the image data that includes identifier data (represented as the position marker 236 in FIG. 3) represents only a portion of the image data comprising a screenshot. Accordingly, after the controller 120 locates identifier data, the controller only processes the image data of subsequent screenshots that are located within a target area 320 (see FIG. 3) that is centered about the position marker 236. This software routine frees up processing power of the controller 120 by preventing the controller from processing image data in which the identifier data is unlikely to be found. If the controller 120 processes the image data within the target area 320 and does not locate identifier data, then the controller processes the image data of the entire screenshot.

The controller 120 strategically positions the target area 320 to account for the movement of the identifier 121 and the vehicle V with which it is associated. As shown in FIG. 3, the target area 320 is centered about the identifier data. However, if the controller 120 determines that the heading of the beacon 124 corresponds to the vector 324 (as shown in FIG. 3), then before processing the next screenshot the controller reposition the target area 320' so that more of the target area 320' leads the beacon, thereby increasing the likelihood that the beacon data is within the target area 320' in the next screenshot.

While the system 100 has been illustrated and described in detail in the drawings and foregoing description, the same should be considered as illustrative and not restrictive in character. It is understood that only the preferred embodiments have been presented and that all changes, modifications, and further applications that come within the spirit of the system described herein are desired to be protected.

What is claimed is:

1. A vehicle tracking system for tracking a position of at least one vehicle of a plurality of vehicles within a region, comprising:

a plurality of passive identifiers, at least one passive identifier of said plurality of passive identifiers provided on each of the vehicles;

an imaging device configured to generate image data including (i) region data representative of the region and (ii) identifier data representative of at least the at least one passive identifier associated with a corresponding vehicle located in said region; and a controller including zone data based on a plurality of virtual zones in said region and configured (i) to process said identifier data to generate position data representative of a corresponding position of each passive identifier within said region, (ii) to process said identifier data to generate identification data that are unique to each passive identifier, (iii) to process said position data and said zone data to generate active zone data corresponding to said virtual zones in which one or more of said passive identifies are located, and (iv) to output said image data, said position data, said zone data, said active zone data, and said identification data to a monitor.

2. The vehicle tracking system of claim 1, wherein said controller processes said zone data and said active zone data such that said virtual zones corresponding to said zone data and said active zone data are displayed on the monitor differently than said virtual zones corresponding to only said zone data.

3. The vehicle tracking system of claim 1, wherein said plurality of passive identifiers includes an optical code.

4. The vehicle tracking system of claim 3, wherein said optical code is one of a linear barcode and a two dimensional barcode.

5. The vehicle tracking system of claim 1, wherein at least one of said passive identifiers is painted onto one of the vehicles.

6. The vehicle tracking system of claim 1, wherein at least some of said passive identifiers of said plurality of passive identifiers includes a character associated with at least some of the vehicles.

7. The vehicle tracking system of claim 1, wherein:
at least some of said passive identifiers of said plurality of passive identifiers includes a shape member associated with at least some of the vehicles, and
said shape member defines a shape that is unique to the region.

8. A vehicle tracking system for tracking a plurality of vehicles within a region, each of the vehicles being associated with a corresponding load, the vehicle tracking system comprising:

a plurality of passive identifiers, at least one passive identifier of said plurality of passive identifiers provided on each of the vehicles;

a plurality of detectors, at least one of said detectors provided on each of the vehicles, and each of said detectors configured to detect the load associated with the vehicle and to emit a corresponding load identifying signal;

an imaging device configured to generate image data including (i) region data representative of the region and (ii) and identifier data representative of at least the at least one passive identifier associated with a corresponding vehicle located in said region; and a controller including zone data based on a plurality of virtual zones in said region and configured (i) to process said load identifying signals and said identifier data to generate load position data representative of a corresponding position of each of the loads within said region, (ii) to process said load position data and said zone data to generate active zone data corresponding to said virtual zones in which one or more of the loads are located, and (iii) to output said load position data, said image data, said identifier data, and at least one of said zone data and said active zone data to a monitor.

9. The vehicle tracking system of claim 8, wherein said controller processes said zone data and said active zone data such that said virtual zones corresponding to said zone data and said active zone data are displayed on the monitor differently than said virtual zones corresponding to only said zone data.

10. The vehicle tracking system of claim 8, wherein said plurality of passive identifiers includes an optical code.

11. The vehicle tracking system of claim 10, wherein said optical code is one of a linear barcode and a two dimensional barcode.

12. The vehicle tracking system of claim 8, wherein at least one of said passive identifiers is painted onto one of the vehicles.

13. The vehicle tracking system of claim 8, wherein at least some of said passive identifiers of said plurality of passive identifiers includes a character associated with at least some of the vehicles.

14. The vehicle tracking system of claim 8, wherein:
at least some of said passive identifiers include a shape member associated with at least some of the vehicles, and
said shape member defines a shape that is unique to the region.

* * * * *